US011919631B2

(12) United States Patent
Bower

(10) Patent No.: US 11,919,631 B2
(45) Date of Patent: Mar. 5, 2024

(54) VERTICAL TAKE-OFF AND LANDING AIRCRAFT WITH AFT ROTOR TILTING

(71) Applicant: Archer Aviation, Inc., San Jose, CA (US)

(72) Inventor: Geoffrey C. Bower, Sunnyvale, CA (US)

(73) Assignee: Archer Aviation, Inc., San Jose, CA (US)

( * ) Notice: Subject to any disclaimer, the term of this patent is extended or adjusted under 35 U.S.C. 154(b) by 77 days.

(21) Appl. No.: 17/170,242

(22) Filed: Feb. 8, 2021

(65) Prior Publication Data

US 2022/0250742 A1    Aug. 11, 2022

(51) Int. Cl.
*B64C 29/00*     (2006.01)
*B64C 27/28*     (2006.01)

(52) U.S. Cl.
CPC .......... *B64C 29/0033* (2013.01); *B64C 27/28* (2013.01)

(58) Field of Classification Search
CPC ................................................. B64C 29/0033
See application file for complete search history.

(56) References Cited

U.S. PATENT DOCUMENTS

| | | |
|---|---|---|
| 3,059,876 A | 10/1962 | Platt |
| 3,081,964 A | 3/1963 | Quenzler |
| 3,089,666 A | 5/1963 | Quenzler |
| 3,181,810 A | 5/1965 | Olson |
| 3,389,878 A | 6/1968 | Westrup |
| 3,889,902 A | 6/1975 | Madet |

(Continued)

FOREIGN PATENT DOCUMENTS

| | | |
|---|---|---|
| CN | 202244078 U | 5/2012 |
| CN | 203681869 U | 7/2014 |

(Continued)

OTHER PUBLICATIONS (Jan. 20, 2013). "It's a Quad . . . it's a Plane . . . It's a SuperSchizoQuadPlane!" retrieved from webpage https://www.youtube.com/watch?v=8HQT4XsZBRo&t=2s, on Apr. 7, 2021, 5 pages.

(Continued)

*Primary Examiner* — Tien Q Dinh
*Assistant Examiner* — William L Gmoser
(74) *Attorney, Agent, or Firm* — MORRISON & FOERSTER LLP

(57) ABSTRACT

A vertical take-off and landing aircraft may include a fuselage; at least one wing connected to the fuselage; a first plurality of proprotors mounted to the at least one wing, positioned at least partially forward of a leading edge of the at least one wing, and tiltable between lift configurations for providing lift for vertical take-off and landing of the aircraft and propulsion configurations for providing forward thrust to the aircraft; and a second plurality of proprotors mounted to the at least one wing, positioned at least partially rearward of a trailing edge of the at least one wing, and tiltable between lift configurations for providing lift for vertical take-off and landing of the aircraft and propulsion configurations for providing forward thrust to the aircraft; wherein the first plurality of proprotors and the second plurality of proprotors are independently tiltable.

23 Claims, 9 Drawing Sheets

(56) References Cited

U.S. PATENT DOCUMENTS

| | | | |
|---|---|---|---|
| 5,419,514 | A | 5/1995 | Duncan |
| 6,293,491 | B1 | 9/2001 | Wobben |
| 6,655,631 | B2 | 12/2003 | Austen-Brown |
| 6,892,980 | B2 | 5/2005 | Kawai |
| 7,159,817 | B2 | 1/2007 | VanderMey et al. |
| 8,128,033 | B2 | 3/2012 | Raposo |
| 8,129,951 | B2 | 3/2012 | Turner et al. |
| 8,174,238 | B2 | 5/2012 | Badger |
| 8,485,464 | B2 | 7/2013 | Kroo |
| 8,487,558 | B2 | 7/2013 | Ogawa et al. |
| 8,552,686 | B2 | 10/2013 | Jung et al. |
| 9,187,174 | B2 | 11/2015 | Shaw |
| 9,296,477 | B1 | 3/2016 | Coburn |
| 9,493,090 | B2 | 11/2016 | Timmons et al. |
| 9,601,812 | B2 | 3/2017 | Namou et al. |
| 9,616,766 | B2 | 4/2017 | Fujii |
| 9,643,720 | B2 | 5/2017 | Hesselbarth |
| 9,713,961 | B2 | 7/2017 | Fan et al. |
| 9,764,833 | B1 | 9/2017 | Tighe et al. |
| 9,783,037 | B2 | 10/2017 | Muto et al. |
| 10,029,785 | B2 | 7/2018 | Niedzballa |
| 10,124,890 | B2 | 11/2018 | Sada-Salinas et al. |
| 10,128,674 | B2 | 11/2018 | Nelson |
| 10,131,426 | B2 | 11/2018 | Judas et al. |
| 10,162,367 | B2 | 12/2018 | Douglas et al. |
| 10,179,519 | B2 | 1/2019 | Schmidt |
| 10,189,565 | B2 | 1/2019 | Patterson et al. |
| 10,317,914 | B2 | 6/2019 | Douglas et al. |
| 10,322,796 | B2 | 6/2019 | Lee |
| 10,351,236 | B1 | 7/2019 | Woodworth et al. |
| 10,364,036 | B2 | 7/2019 | Tighe et al. |
| 10,501,173 | B1 | 12/2019 | Douglas et al. |
| 10,752,350 | B2 | 8/2020 | McCullough et al. |
| 2005/0230524 | A1 | 10/2005 | Ishiba |
| 2006/0032970 | A1 | 2/2006 | Allen |
| 2007/0158494 | A1 | 7/2007 | Burrage |
| 2013/0026305 | A1 | 1/2013 | Wang |
| 2013/0062455 | A1 | 3/2013 | Lugg et al. |
| 2015/0014475 | A1 | 1/2015 | Taylor et al. |
| 2015/0136897 | A1 | 5/2015 | Seibel et al. |
| 2015/0360775 | A1 | 12/2015 | Arai |
| 2016/0288903 | A1 | 10/2016 | Rothhaar |
| 2017/0240273 | A1 | 8/2017 | Yuen |
| 2018/0105267 | A1 | 4/2018 | Tighe |
| 2018/0105279 | A1 | 4/2018 | Tighe et al. |
| 2019/0100313 | A1* | 4/2019 | Campbell ........... B64C 29/0033 |
| 2019/0127056 | A1 | 5/2019 | Weekes et al. |
| 2019/0135408 | A1 | 5/2019 | Moore et al. |
| 2019/0135424 | A1 | 5/2019 | Baity et al. |
| 2019/0144126 | A1* | 5/2019 | Groninga ............... B64D 27/24 244/53 B |
| 2019/0229541 | A1 | 7/2019 | Ono |
| 2019/0255967 | A1 | 8/2019 | Doersam et al. |
| 2019/0256194 | A1* | 8/2019 | Vander Lind ....... B64C 29/0025 |
| 2019/0329882 | A1* | 10/2019 | Baity ...................... B64C 27/08 |
| 2020/0140079 | A1* | 5/2020 | Campbell ............. B64C 39/024 |
| 2021/0206487 | A1* | 7/2021 | Iqbal .................. B64C 29/0083 |
| 2021/0253234 | A1 | 8/2021 | Tao |
| 2021/0362849 | A1 | 11/2021 | Bower et al. |
| 2021/0403154 | A1 | 12/2021 | Tighe |
| 2022/0127011 | A1 | 4/2022 | Long et al. |
| 2022/0324558 | A1* | 10/2022 | Ross ................... B64C 29/0033 |
| 2023/0021800 | A1* | 1/2023 | Britchford .............. B64C 11/46 |
| 2023/0056974 | A1* | 2/2023 | Foskey .................. B64D 27/24 |
| 2023/0286650 | A1* | 9/2023 | Peck ....................... B64C 27/28 244/7 A |

FOREIGN PATENT DOCUMENTS

| | | |
|---|---|---|
| CN | 204642150 U | 9/2015 |
| CN | 204701770 U | 10/2015 |
| CN | 105292454 A | 2/2016 |
| CN | 105292468 A | 2/2016 |
| CN | 205098473 U | 3/2016 |
| CN | 105539835 A | 5/2016 |
| CN | 104802985 B | 1/2017 |
| CN | 105460210 B | 8/2018 |
| DE | 1080860 B | 4/1960 |
| DE | 1406514 A1 | 10/1968 |
| DE | 1406518 A1 | 1/1969 |
| DE | 19745492 B4 | 6/2005 |
| DE | 202014004877 U1 | 8/2014 |
| EP | 2776315 B1 | 4/2016 |
| EP | 3038913 B1 | 4/2019 |
| EP | 4249373 A1 * | 9/2023 ............ B64C 11/46 |
| GB | 410747 A | 5/1934 |
| GB | 935715 A | 9/1963 |
| GB | 935884 A | 9/1963 |
| JP | 2010-183671 A1 | 8/2010 |
| JP | 2015-180563 A | 10/2015 |
| JP | 2015-180564 A | 10/2015 |
| KR | 10-2016-0116736 A | 10/2016 |
| KR | 10-2179828 B1 | 11/2020 |
| RU | 2448869 C1 | 4/2012 |
| RU | 127365 U1 | 4/2013 |
| RU | 2657706 C1 | 6/2018 |
| WO | 2012/133706 A1 | 10/2012 |
| WO | 2014/058351 A2 | 4/2014 |
| WO | 2019/041383 A1 | 3/2019 |
| WO | 2020/058706 A1 | 3/2020 |
| WO | 2020/169940 A1 | 8/2020 |
| WO | 2021/155208 A1 | 8/2021 |

OTHER PUBLICATIONS

Web page https://https://kittyhawk.aero/heaviside/ , Oct. 22, 2020, retrieved from Internet Archive Wayback Machine https://web.archive.org/web/20201022210104/https://kittyhawk.aero/heaviside/ on Apr. 7, 2021, 5 pages.

Bower et al., U.S. Appl. No. 16/878,380, filed May 19, 2020 for "Vertical Take-Off and Landing Aircraft."

Bower et al., U.S. Appl. No. 17/157,580, filed Jan. 25, 2021 for "Systems and Methods for Control Allocation for Electric Vertical Take-Off and Landing Aircraft."

Web page https://wisk.aero/, Oct. 31, 2020, retrieved from Internet Archive Wayback Machine https://web.archive.org/web/20201031013303/https:/wisk.aero/cora/ on Apr. 7, 2021, 9 pages.

Web page https://www.jobyaviation.com/, Oct. 1, 2020, retrieved from Internet Archive Wayback Machine https://web.archive.org/web/20201001151016/https://www.jobyaviation.com/ on Apr. 7, 2021, 5 pages.

Byun et al. (Oct. 2014). "Design and Fabrication of a Scaled-Down Unmanned Quad-Tilt-Prop Personal Air Vehicle," Journal of Aerospace Engineering: pp. 1-15.

International Search Report and Written Opinion dated Sep. 1, 2021, directed to International Application No. PCT/US2021/032874; 20 pages.

Staruk et al. "Control and Stability Characteristics of Gamera II: A Human Powered Helicopter," American Helicopter Society 69th Annual Forum, May 21-23, 2013, Phoenix, Arizona; pp. 1-12.

U/Watchung. (Nov. 3, 2020) "Curtis-Wright Model 300 VTOL transport. It was intended to serve as a local commuter plane to shuttle passengers from city centers to outlying airports. Designed in the early '60s as an expanded version of the X-19 quad tiltrotor, the failure of that program scuppered all further development," located at www.reddit.com. 3 pages.

Bower et al., U.S. Office Action dated Mar. 29, 2022, directed to U.S. Appl. No. 16/878,380; 12 pages.

International Search Report and Written Opinion dated May 3, 2022, directed to International Application No. PCT/US2022/070545; 16 pages.

Bower et al., U.S. Appl. No. 29/866,698, filed Sep. 23, 2022 for "Vertical Take-Off and Landing Aircraft."

\* cited by examiner

VERTICAL TAKE-OFF AND LANDING AIRCRAFT WITH AFT ROTOR TILTING

FIELD OF THE DISCLOSURE

This disclosure generally relates to vertical take-off and landing aircraft, and more specifically to fixed wing vertical take-off and landing aircraft.

BACKGROUND OF THE DISCLOSURE

Vertical take-off and landing (VTOL) aircraft are aircraft that can take-off and land vertically and hover, providing the ability to carry travelers directly to their destination. Some VTOL aircraft generate lift entirely through its propulsion system in all stages of flight. While other VTOL aircraft have wings to provide lift required during forward flight. Due to the lift provided by the wings, winged VTOL aircraft typically require lower power output from its propulsion system during forward flight than during vertical flight. Some winged VTOL aircraft include a plurality of rotors that collectively provide the vertical thrust required for vertical flight. At least some of the rotors may be tiltable to provide forward thrust during forward flight. In some cases, a portion of the rotors are only used in vertical flight and are not tiltable. These non-tiltable rotors may be deactivated during forward flight with their blades fixed in position. To reduce drag caused by the fixed blades during forward flight, the non-tiltable rotors may have only two blades so that the blades can be aligned with the forward direction of flight. However, there are disadvantages associated with two-bladed rotors, including unsteady aerodynamic and gyroscopic loading that increases noise, increases vibration, and requires heavier aircraft components to withstand increased vibration.

SUMMARY OF THE DISCLOSURE

According to some embodiments, a vertical take-off and landing aircraft includes a fixed wing, a set of independently tiltable proprotors mounted to the fixed wing and positioned forward of the fixed wing, and a set of independently tiltable proprotors mounted to the fixed wing and positioned aft of the fixed wing. Due to their aft positioning, the aft proprotors tilt in the opposite direction from the forward proprotors. Each of the proprotors can be independently tilted for providing vertical thrust during hover and for providing forward thrust during cruise. By configuring the VTOL aircraft so that all proprotors can be used during all stages of flight, the aircraft can have reduced drag during forward flight relative to aircraft that have rotors that are not used during forward flight.

According to some embodiments, each of the tiltable proprotors of the VTOL aircraft may have a propeller that includes at least three blades, and thus each propeller avoids unsteady loading associated with two-bladed propellers. The at least three-bladed propellers can operate at lower tip speeds (compared to a two-bladed propeller) to reduce an acoustic signature of the proprotor while still achieving thrust requirements of the proprotor.

According to some embodiments, a vertical take-off and landing aircraft includes: a fuselage; at least one wing connected to the fuselage; a first plurality of proprotors mounted to the at least one wing, positioned at least partially forward of a leading edge of the at least one wing, and tiltable between lift configurations for providing lift for vertical take-off and landing of the aircraft and propulsion configurations for providing forward thrust to the aircraft; and a second plurality of proprotors mounted to the at least one wing, positioned at least partially rearward of a trailing edge of the at least one wing, and tiltable between lift configurations for providing lift for vertical take-off and landing of the aircraft and propulsion configurations for providing forward thrust to the aircraft; wherein the first plurality of proprotors and the second plurality of proprotors are independently tiltable.

In any of these embodiments, the aircraft may include a control system configured to independently tilt at least one proprotor of the second plurality of proprotors relative to another proprotor of the second plurality of proprotors.

In any of these embodiments, the aircraft may include a control system configured to independently tilt at least one proprotor of the second plurality of proprotors relative to at least one proprotor of the first plurality of proprotors.

In any of these embodiments, the first plurality of proprotors may include at least four proprotors and the second plurality of proprotors comprises at least four proprotors.

In any of these embodiments, the aircraft may include at least one boom mounted to the at least one wing, wherein a proprotor of the first plurality of proprotors and a proprotor of the second plurality of proprotors is mounted to the at least one boom.

In any of these embodiments, each proprotor of the first plurality of proprotors and each proprotor of the second plurality of proprotors may include at least three blades.

In any of these embodiments, a sum of disc area of the first plurality of proprotors and the second plurality of proprotors may be at least an area of the at least one wing.

In any of these embodiments, a proprotor of the second plurality of proprotors may be canted relative to another proprotor of the second plurality of proprotors such that a rotational axis of the proprotor is non-parallel with a rotational axis of the other proprotor.

In any of these embodiments, a range of tilt of at least one proprotor of the second plurality of proprotors may be greater than ninety degrees.

In any of these embodiments, the at least one wing may be a high wing mounted to an upper side of the fuselage.

In any of these embodiments, an electric power of at least one of the first plurality of proprotors and the second plurality of proprotors may be at least 10 kilowatts.

In any of these embodiments, the aircraft may be electrically powered.

In any of these embodiments, the aircraft may be manned.

In some embodiments, a method for operating an aircraft includes: independently controlling tilts of a first plurality of proprotors mounted to a wing of the aircraft and positioned at least partially forward of the leading edge of the wing to provide vertical thrust for lifting the aircraft during vertical take-off and landing and to provide forward thrust during cruise; and independently controlling tilts of a second plurality of proprotors mounted to the wing of the aircraft and positioned at least partially rearward of the trailing edge of the wing to provide vertical thrust for lifting the aircraft during vertical take-off and landing and to provide forward thrust during cruise.

In any of these embodiments, independently controlling tilts of the second plurality of proprotors may include tilting at least one proprotor of the second plurality of proprotors and tilting at least another proprotor of the second plurality of proprotors.

In any of these embodiments, the wing may be connected to a fuselage, and the at least one proprotor of the second plurality of proprotors may be mounted to the wing to a left of the fuselage and the at least other proprotor of the second plurality of proprotors may be mounted to the wing to a right of the fuselage.

In any of these embodiments, independently controlling tilts of the first plurality of proprotors may include tilting at least one proprotor of the first plurality of proprotors about a pivot axis of the at least one proprotor of the first plurality of proprotors in a first direction, and independently controlling tilts of the second plurality of proprotors comprises tilting at least one proprotor of the second plurality of proprotors about a pivot axis of the second plurality of proprotors in a direction opposite to the first direction.

In any of these embodiments, independently controlling tilts of the first plurality of proprotors may include tilting at least one proprotor of the first plurality of proprotors independent of at least another proprotor of the first plurality of proprotors, and independently controlling tilts of the second plurality of proprotors comprises tilting at least one proprotor of the second plurality of proprotors independent of at least another proprotor of the second plurality of proprotors.

BRIEF DESCRIPTION OF THE DRAWINGS

The disclosure will now be described, by way of example only, with reference to the accompanying drawings, in which.

DETAILED DESCRIPTION OF EXEMPLARY EMBODIMENTS

Figure 1:
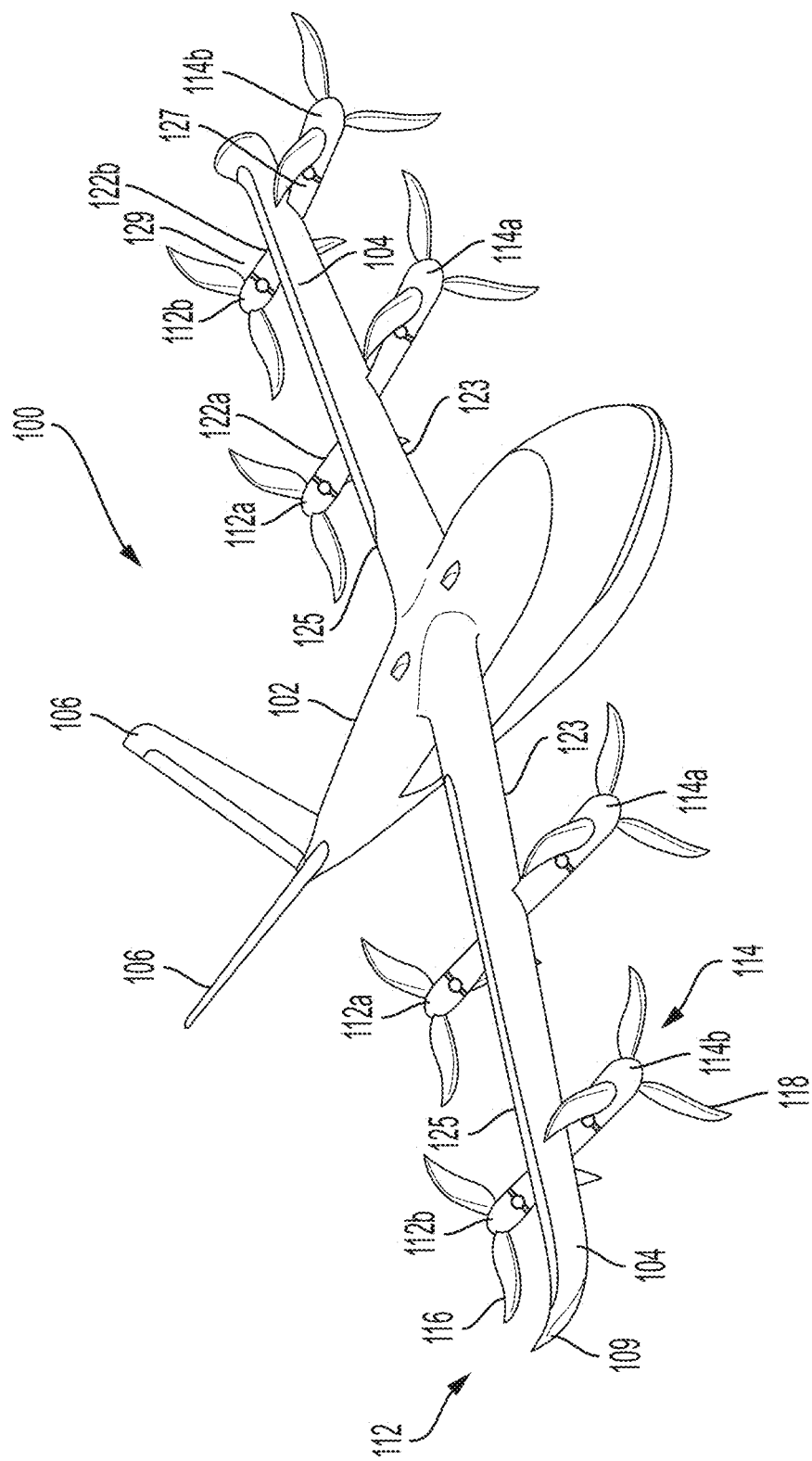
FIG. 1 shows a vertical take-off and landing (VTOL) aircraft in a cruise configuration, according to some embodiments.

Systems and methods according to various embodiments described herein include an electric VTOL aircraft that has a plurality of proprotors that are all independently tiltable from vertical thrust positions for providing lift during vertical take-off and landing and forward thrust positions for forward flight. A set of the proprotors may be mounted to the wings of the aircraft, forward of the wings, and a set of the proprotors may be mounted to the wings of the aircraft, aft of the wings. According to some embodiments, independently tilting a plurality of front proprotors mounted to a wing and independently tilting a plurality of aft proprotors mounted to the same wing can provide advantages not present in conventional aircraft. For example, independently tilting each proprotor of the plurality of proprotors can create additional degrees of freedom relative to aircraft in which a portion of the rotors are fixed. These additional degrees of freedom can be used to generate yawing moments that may be useful for controlling the aircraft during different stages of flight. Also, these additional degrees of freedom allow for increased redundancy in controlling tilt and propulsion, and thus the independently tiltable proprotors may be sized smaller relative to aircraft in which a portion of the rotors are fixed.

Contrary to non-tilting two-bladed aft rotors, the aft proprotors described herein are tiltable to forward thrust positions such that during forward flight, the tiltable aft rotors are not required to lock their blades in fixed positions. Instead, the tiltable aft rotors described herein can provide forward thrust to overcome drag during forward flight. Since the tiltable rotors do not require locking their blades during forward flight, the tiltable aft rotors can have more than two blades. Non-tilting aft rotors are limited to having only two blades since having more blades would produce high drag when the blades are fixed during forward flight. Therefore, aft proprotors tiltable to vertical thrust positions during vertical flight and to forward thrust positions during forward flight can have a higher number of propeller blades than non-tilting aft rotors that are configured to provide thrust only during vertical flight.

According to some embodiments, the tiltable aft proprotors described herein have at least three propeller blades per proprotor, thereby drastically reducing unsteady aerodynamic and gyroscopic loading in the aircraft frame compared to two-bladed non-tilting aft rotors which extends the fatigue life of the structure. The tiltable aft proprotors having at least three blades also allow the aft proprotors to operate at lower propeller tip speeds relative to two-bladed aft proprotors providing the same thrust, which can reduce the relative amount of noise generated by the aft proprotors. Therefore, tilting aft proprotors as described herein increase aft proprotor efficiency by creating additional degrees of freedom and by allowing the aft proprotors to have at least three propeller blades. Due to this increased efficiency, the tiltable aft proprotors may be sized smaller than conventional non-tilting aft rotors such that at least a total of eight proprotors can be mounted the same wing providing enough to handle one or more failed proprotors as conventional non-tiltable aft rotors.

Furthermore, a proprotor configuration in which all the proprotors (front and aft) are independently tiltable and the aft proprotors are mounted to the same wing as the front proprotors and rearwardly aligned with the front proprotors provides structural advantages. For example, by configuring aircraft to have tiltable aft proprotors mounted to the same wing as the tiltable front proprotors and rearwardly aligned with the tiltable front proprotors, there is symmetrical loading that minimizes twisting loads on the aircraft/wings that would otherwise have to be mitigated by hull and/or wing designs that would add structural weight.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a", "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable tilt propeller that can provide thrust for vertical lift and for forward propulsion by varying the tilt of the propeller.

As used herein, a proprotor lift configuration refers to any proprotor orientation in which the proprotor thrust is providing primarily lift to the aircraft and proprotor propulsion configuration refers to any proprotor orientation in which the proprotor thrust is providing primarily forward thrust to the aircraft.

Figure 2:
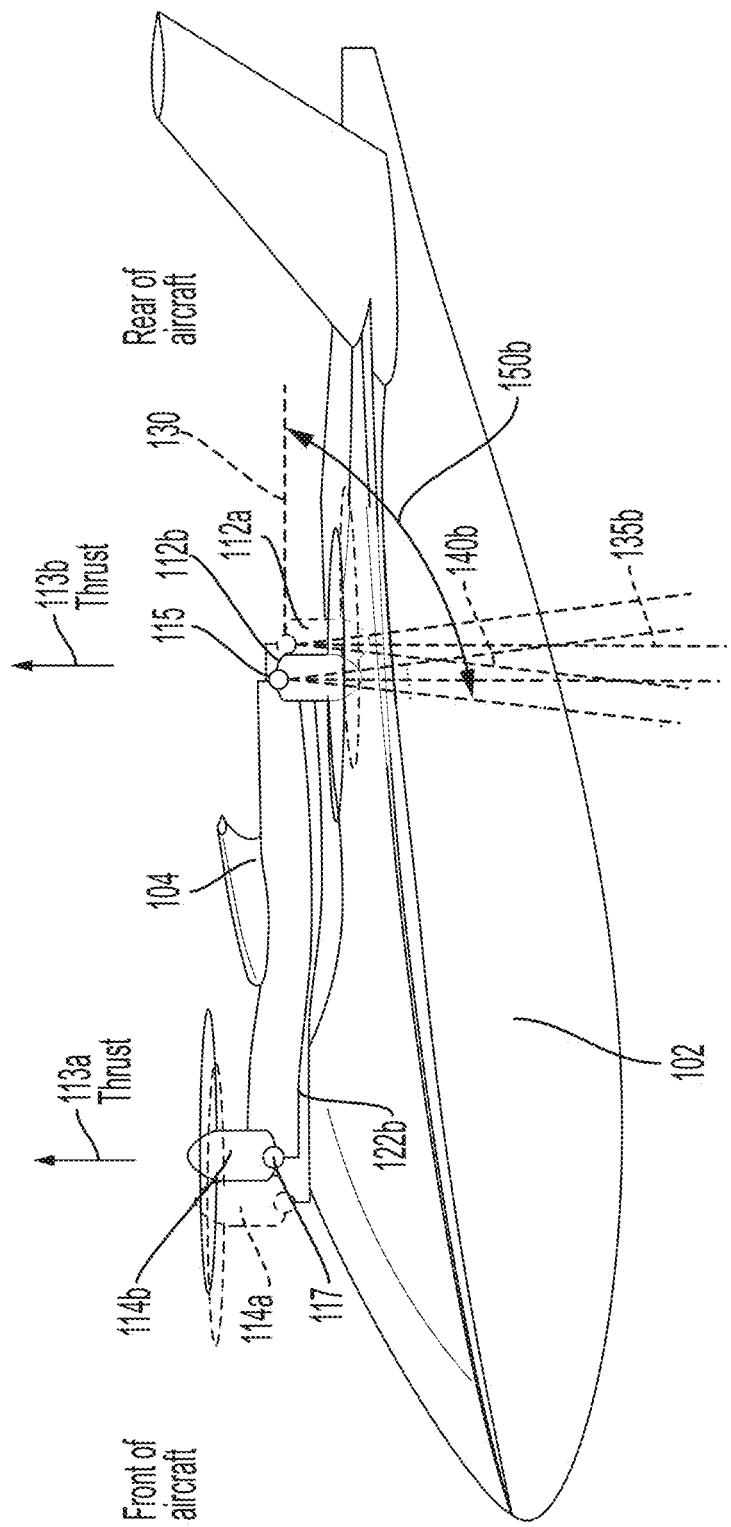
FIG. 2 shows a VTOL aircraft in a lift configuration, according to some embodiments.
Figure 3:
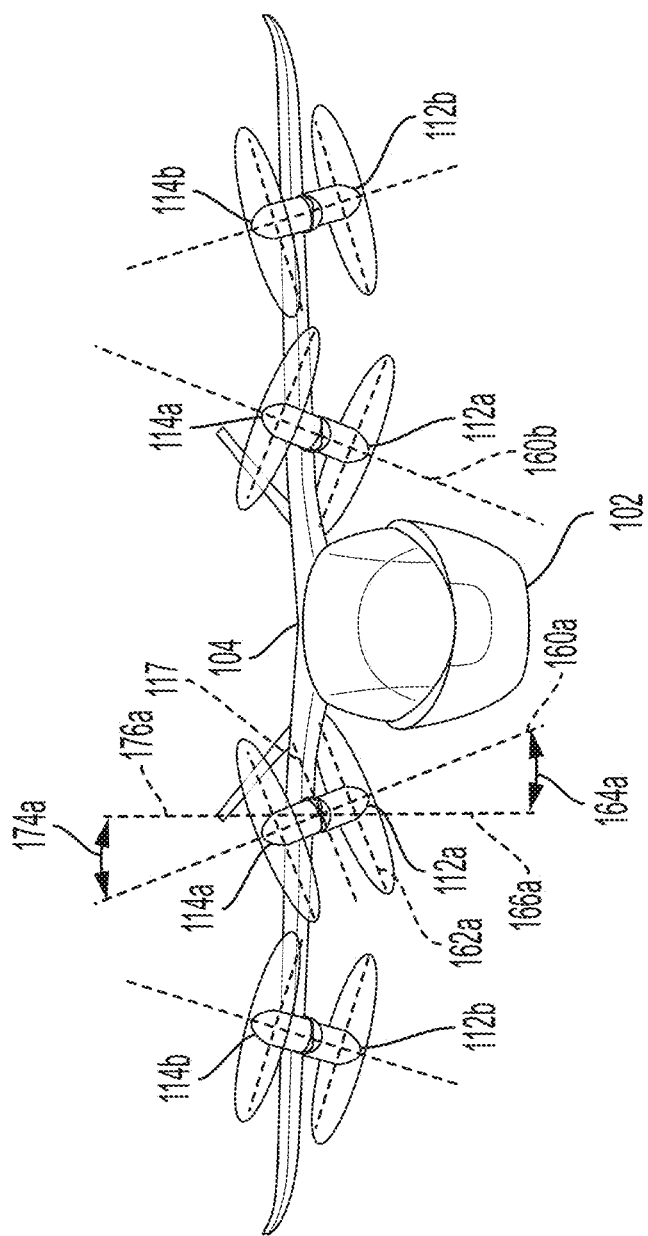
FIG. 3 is a front view of a VTOL aircraft that show canting of the proprotors in a lift configuration, according to some embodiments.
Figure 4:
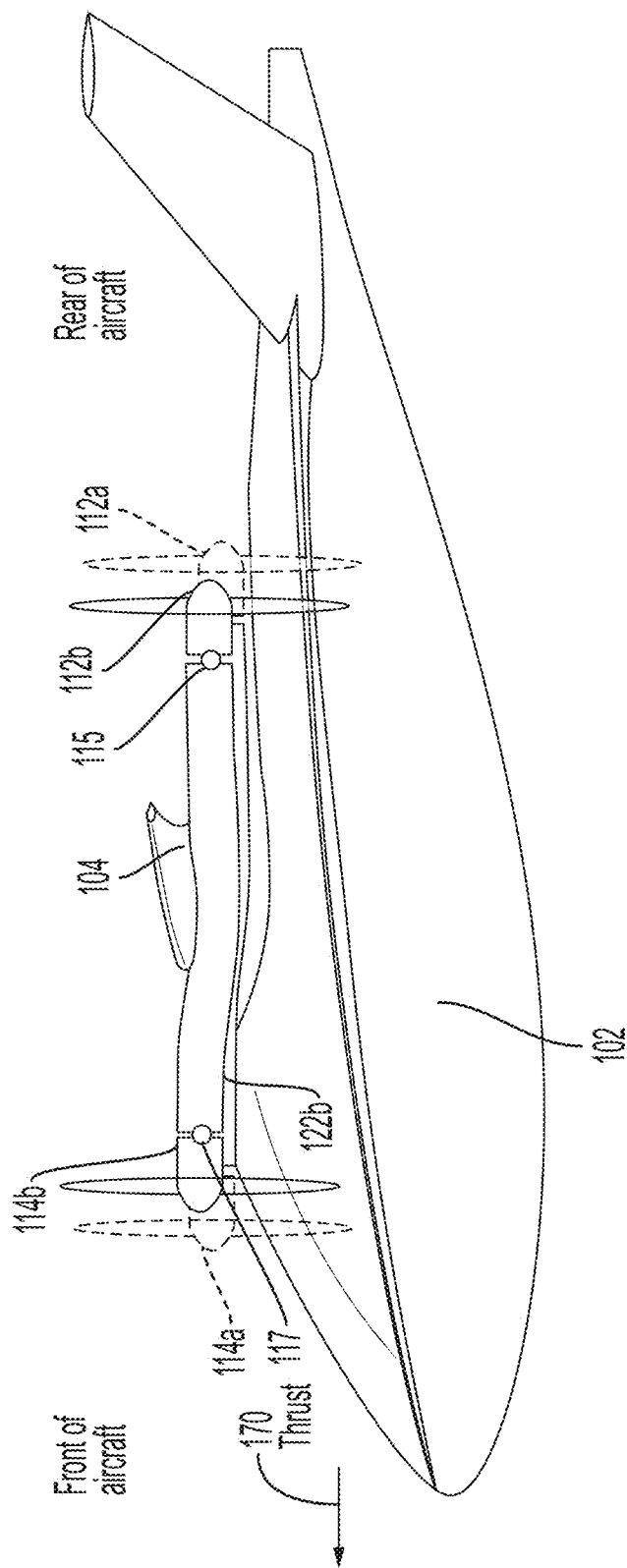
FIG. 4 shows a side view of a boom mounted to wings, and proprotors mounted at opposite ends of the boom and tilted in propulsion configurations, according to some embodiments.

FIG. 1 illustrates a vertical take-off and landing (VTOL) aircraft 100 in a cruise configuration, according to some embodiments. The aircraft 100 includes a fuselage 102, wings 104 mounted to the fuselage 102, and one or more rear stabilizers 106 mounted to the rear of the fuselage 102. Aircraft 100 includes a plurality of proprotors 112 mounted to the wings 104 aft of the wings 104 and a plurality of proprotors 114 that are mounted to the wings 104 forward of the wings 104. As described further below, each of the proprotors 112 and 114 is tiltable between forward thrust positions for forward flight, as shown in FIG. 1, and vertical thrust positions for vertical flight, as shown in FIGS. 2-4. According to some embodiments, proprotors 112 may be tilted independently of proprotors 114 and proprotors 114 may be tilted independently of proprotors 112. According to some embodiments, each proprotor of proprotors 112 and each proprotor of proprotors 114 may be independently tilted. By tilting proprotors 112 and proprotors 114, aircraft 100 can use proprotors 112 and proprotors 114 to collectively achieve a power output required for vertical flight and forward flight. Such collective use of proprotors 112 and proprotors 114 enables a reduced thrust requirement from individual proprotors compared, for example, to utilization of only proprotors 114 for providing thrust during forward flight. That is, aircraft 100 can use both the plurality of proprotors 112 and the plurality of proprotors 114 to overcome weight of aircraft during vertical flight and overcome drag during forward flight. By tilting the aft proprotors 112, the aft proprotors 112 are not limited to only two blades required for low drag positions during forward flight. Instead, the aft proprotors 112 can be tilted to provide forward thrust during forward flight. Additionally, as detailed further below, the tilting of proprotors 112 and proprotors 114 increase yaw control of aircraft 100.

According to some embodiments, each proprotor of aircraft 100 may include a propeller that has a number of propeller blades that is selected to drastically reduce unsteady loading (aerodynamic and gyroscopic) and to decrease a lower bound of tip speeds of the blades that meets the thrust requirements for all stages of flight while reducing the amount of noise generating by the proprotors. The number of blades of the proprotors and the tip speed of the blades of the proprotors affect the amount of noise generated by the proprotors such that increasing the number of propeller blades allows the proprotor to achieve an amount of thrust at lower tip speeds, and decreasing the tip speed of a proprotor decreases noise generated by the proprotor. In particular, having two propeller blades leads to unsteady loading and requires high tip speeds. In the example of FIG. 1, the plurality of proprotors 112 include three blades 116 and the plurality of proprotors 114 include three blades 118. Having at least three blades reduces the unsteady loading associated with two-bladed propellers and enables the blades to be spun at lower tip speeds compared to two-bladed propellers. Thus, the example of FIG. 1 enables quieter aircraft operation compared to similar aircraft having two-bladed proprotors. In some embodiments, the proprotors 114 include more blades 118 than the proprotors 112. For example, the proprotors 112 may each include three blades and the proprotors 114 may each include five blades. According to some embodiments, the proprotors 112 and proprotors 114 can each have from three to five blades. According to some embodiments, gyroscopic loading on the wings 104 may be balanced by rotating blades 116 of proprotors 112 in a first direction and rotating blades 118 of proprotors 114 in a second direction opposite the first direction.

According to some embodiments, the proprotors 112 and/or proprotors 114 are configured to have relatively low tip speed to decrease the amount of noise generated by the aircraft. In some embodiments, the tip speed of the proprotor blades 112, 114 in hover is at least about 0.2 Mach or 0.3 Mach. In some embodiments, the tip speed of the proprotor blades 112, 114 in hover is at most about 0.7 Mach or 0.6 Mach. In some embodiments, the tip speed of the proprotor blades 112, 114 in hover is at about 0.2-0.7 Mach or 0.3-0.6 Mach. According to various embodiments, the diameter of the rotor and/or proprotor blades is the range of 1 to 5 meters, preferably in the range of 1.5 to 3 meters.

According to some embodiments, the proprotors 112 and proprotors 114 are positioned and configured to minimize the damage that may occur due to blade failure (commonly referred to as rotor burst). According to some embodiments, the proprotors 114 are positioned forward of a leading edge 123 of the wings 104 and proprotors 112 are positioned rearward of a trailing edge 125 of the wings 104. The proprotors 112, 114 can be mounted to the wings via booms 122. Each boom can support a proprotor 114 at its front end 127 and a proprotor 112 at its rear end 129.

According to some embodiments, the proprotors are staggered in the forward and rearward direction to prevent broken blades of one proprotor from hitting the blades of the adjacent proprotor. According to some embodiments, the proprotors 112 and proprotors 114 may be staggered in the forward-rearward direction such that the plane of rotation of the proprotors in their propulsion configurations are non-coplanar. For example, in the illustrated embodiments, the innermost proprotors 114a are forward of other proprotors 114b. In some embodiments, the innermost proprotors 114a are forward of the passenger and pilot compartment or forward of the forward-most location of passengers or pilot in the passenger compartment to ensure that a broken blade cannot enter the passenger compartment and injure a passenger. According to some embodiments, the innermost proprotors 112a are positioned rearward of the other proprotors 112b. In some embodiments, at least two proprotors on the same side of the aircraft are aligned such that their blade rotation planes are coplanar.

During vertical take-off and landing and hover, each proprotor of proprotors 112 and each proprotor of proprotors 114 are tilted to vertical thrust positions to produce an upward thrust for providing lift. During vertical take-off and landing and hover, aircraft 100 may require a power output from proprotors 112, 114 that is higher than a power output from proprotors 112, 114 during other aircraft operations (such as forward climb or forward cruise). To limit the power output required during high power demand operations to a desired range, proprotors 112, 114 of aircraft 100 may have a disc area larger than a wing area of the aircraft. The disc area of a proprotor is an area in which the blades rotate within during flight. The disc area and wing area is determined from a top view of the aircraft 100 in a hover configuration. According to some embodiments, a sum of the disc areas of all the proprotors may be at least the wing area. According to some embodiments, a sum of the disc areas of all the proprotors should be at least 1.5 times the wing area, 2 times the wing area, or 2.5 times the wing area. According to some embodiments, a sum of the disc areas of all the proprotors should be at most 5 times the wing area, 4 times the wing area, or 3 times the wing area. According to some embodiments, a sum of the disc areas of all the proprotors should be 1 to 5 times the wing area, 1.5 to 4 times the wing area, or 2 to 3 times the wing area.

FIG. 2 shows an example of proprotors 112, 114 in lift positions, according to some embodiments. FIG. 2 is a side view of boom 122b mounted to wings 104 and proprotors 112b, 114b mounted at opposite ends of boom 122b and tilted in exemplary lift positions, according to some embodiments. FIG. 2 also shows proprotors 112a and 114a mounted in dashed lines. Proprotors 112a and 114a are mounted to boom 122a (not shown in FIG. 2). As shown in the example of FIG. 2, to achieve an upward thrust as indicated by arrows 113a, 113b, proprotors 114a, 114b are tilted differently compared to proprotors 112a, 112b— that is, to provide upward lift proprotors 114a, 114b tilt upward about pivot axis 117 and proprotors 112a, 112b tilt downwards about pivot axis 115. In the illustrated embodiment of FIG. 2, the pivot axes 115, 117 extend in and out of the paper. According to some embodiments, in their lift positions, the blades of the aft proprotors 112a, 112b are located below wing 104 and below their respective boom and the blades of the front proprotors 114a, 114b are located above the wing 104 and above their respective boom.

According to some embodiments, a range of tilt of each proprotor of proprotors 112 and each proprotor of proprotors 114 may be greater than 90 degrees. For example, as shown in FIG. 2, the proprotor 112b (outermost of proprotors 112) can tilt between a straight position in a propulsion configuration and a tilted position in a lift configuration. In the straight position, the proprotor may face a rearward direction and align with a horizontal rotational axis 130 of the proprotor 112b. In the tilted position, the proprotor may face a downward direction and align with a vertical or close to vertical rotational axis. According to some embodiments, the tilted position may be just past (for example, about 20 degrees past) a vertical rotational axis 135b as illustrated by rotational axis 140b such that the proprotor 112b has a range of tilt 150b of about 110 degrees. According to some embodiments, each of the proprotors 112 may have a range of about 110 degrees. According to some embodiments, proprotors 114 may have a range of tilt similar to proprotors 112. Proprotors 114 may be tilted similarly to proprotors 112, but may tilt in opposite directions due to its positioning forward of the leading edge of the wing 104 and the direction of thrust required for vertical and forward flight. The ability to tilt the aft proprotors 112 provides additional degrees of freedom that can enable greater yaw control options relative to an aircraft in which only some proprotors (such as only the front proprotors) are tiltable.

According to some embodiments, differential tilt of at least one proprotor of proprotors 112 may help stabilize aircraft and yaw control. Differential tilting includes tilting, for example, proprotors 112b to tilt angles that are small relative to a range of tilt for the proprotor. The differential tilts may be small rearward and forward tilts from vertical. The small tilts may be up to 15 degrees rearward or forward from the vertical axis 135b. For example, a proprotor 112a mounted to a left side of the fuselage 102 (from a front view of aircraft 100) may have a small tilt forward and a proprotor 112a mounted to a right side of the fuselage may have a small tilt rearward to generate a yawing moment. Likewise, differential tilting of at least one proprotor of proprotors 114 may be used to generate a yawing moment.

According to some embodiments, dual differential tilting may be used to help stabilize aircraft and generate yawing moments. Similar to the differential tilts described above, dual differential tilts may be small rearward and forward tilts of at least one proprotor positioned forward of the wing (such as proprotors 114) and at least one proprotor positioned aft of the wing (such as proprotors 112) from vertical. By such dual differential tilting of proprotors positioned at different locations on a wing of the aircraft, yawing moments may be generated to help control the aircraft.

According to some embodiments, the additional degrees of freedom also allow for increased redundancy in controlling tilt and propulsion that is beneficial for handling exemplary failure conditions compared to configurations in which proprotors mounted to the wing and positioned rearward of the wing are not tiltable. Due to the increased redundancy, motors of proprotors 112 and of proprotors 114 may be sized smaller than motors of proprotors of an aircraft in which only some proprotors are tiltable. For example, an aircraft requires an expected amount of thrust from each proprotor during a given flight operation. Should a proprotor fail to meet its expected amount of thrust during the flight operation, other proprotors can provide more thrust up to their maximum thrust capability to compensate for the failed proprotor. According to some embodiments, a proprotor can be oversized such that the proprotor is capable of providing more thrust than its expected hover thrust to ensure that the proprotor can handle increased thrust requirements should another proprotor fail. However, an aircraft having tiltable front proprotors and tiltable aft proprotors has additional degrees of freedom that allow for increased redundancy in controlling tilt and thrust compared to an aircraft that has non-tiltable aft rotors. Due to the increased redundancy, the tiltable proprotors may be sized smaller than proprotors of an aircraft that has non-tiltable aft rotors. According to some embodiments, the tiltable proprotors described herein may be sized smaller than proprotors of an aircraft that has non-tiltable aft rotors by about 2%, 6%, 8%, or 10%. According to some embodiments, the tiltable proprotors described herein may be sized smaller than proprotors of an aircraft that has non-tiltable aft rotors by about 30%, 20%, 15%, or 10%. According to some embodiments, the tiltable proprotors described herein may be sized smaller than proprotors of an aircraft that has non-tiltable aft rotors by 2-30%, 6-20%, or 8-15%.

According to some embodiments, at least one of the proprotors 112 and/or proprotors 114 is canted relative to at least one other proprotor 112 and/or proprotor 114. As used herein, canting refers to a relative orientation of the rotational axis of the proprotor about a line that is parallel to the forward-rearward direction of the aircraft, analogous to the roll degree of freedom of the aircraft. The cant of the proprotors is fixed and does not change during flight. Canting of the proprotors can help minimize damage from rotor burst by orienting the rotational plane of the proprotor discs (the blades plus the rotor portion onto which the blades are mounted) so as to not intersect critical portions of the aircraft (such areas of the fuselage in which people may be positioned, critical flight control systems, batteries, adjacent rotors/proprotors, etc.) or other rotor discs and may provide enhanced yaw control during flight. In some embodiments, a cant angle of any proprotor is such that a respective burst disc will not intersect with passengers or a pilot. In some embodiments, a cant angle of any proprotor is such that a respective burst disc will not intersect with any flight-critical component. (As used herein, a critical component is any component whose failure would contribute to or cause a failure condition that would prevent the continued controlled flight and landing of the aircraft.) The front view of FIG. 3 illustrates canting of the proprotors 112 in a lift configuration (for example, during hover), according to some embodiments. The canting of the proprotors 112 results in the rotation planes of their blades being angled relative to horizontal, as illustrated, for example, by disc 162a being non-horizontal. For example, FIG. 3 shows that the pivot axis 117 of a proprotor 114a is tilted by an amount to accommodate the cant angle of the proprotor. A rotation axis 160a for the innermost proprotor 112a positioned to the left of fuselage 102 (from a front view of aircraft 100) in its lift configuration is provided to illustrate the cant angle of the proprotor 112a. The illustrated cant angle 164a measured from vertical 166a can range from 0 to 30 degrees in either direction. In the illustrated embodiment, innermost proprotor 112a positioned to the right of fuselage 102 (from a front view of aircraft 100) in its lift configuration is canted the same amount but in an opposite direction as the left innermost proprotor 112a such that the rotational axis 160a of left innermost proprotor 112a is not parallel to a rotational axis 160b of right innermost proprotor 112a. The outermost proprotor 112b positioned to the left of fuselage 102 is canted by the same amount but in an opposite direction as the innermost proprotor 112a positioned to the left of fuselage 102. Likewise, the outermost proprotor 112b positioned to the right of fuselage 102 is canted by the same amount but in an opposite direction as the innermost proprotor 112a positioned to the right of fuselage 102. The example of FIG. 3 is merely one example of the relative canting of the proprotors and it will be understood to a person of skill in the art that any suitable combination of proprotor canting (inclusive of no canting) may be used according to the desired performance characteristics of the aircraft.

The proprotors 114 may also be canted in any suitable manner and combination. In some embodiments, the proprotors 114 are canted according to a corresponding proprotor 112. For example, left proprotor 114a may be canted at angle 174a from the vertical 176a. Cant angle 174a and cant angle 164a may be the same amount from vertical, but in opposite directions. Any suitable combination of canting and/or non-canting of the rotors relative to one another and relative to the proprotors can be used to achieve desired performance characteristics.

Once the aircraft has achieved sufficient altitude with its proprotors in lift positions, the tilt of proprotors 112 and proprotors 114 can be varied from tilt angles in which the thrust is directed vertically to provide lift during vertical take-off, vertical landing, and hover to tilt angles in which the proprotor thrust is directed forward to provide forward speed to the aircraft 100. To change from lift positions to forward flight positions, the aft proprotors 112 are tilted in opposite directions than front proprotors 114. For example, to commence forward flight, the aft proprotors 112 can be tilted upward about pivot axis 115 to their forward flight positions and front proprotors 114 can be tilted downward about pivot axis 117 to their forward flight positions. As shown in the example of FIG. 4, proprotors 112a, 112b face in opposite direction than proprotors 114a, 114b—that is, proprotors 112a, 112b face in a rearward direction from aircraft and proprotors 114a, 114b face in a forward direction from aircraft. The proprotors positioned in forward thrust positions generate thrust at each front proprotor and each aft proprotor in a forward direction as indicated by arrow 170. When the aircraft 100 is in full forward flight, lift may be provided entirely by the wings 104, and forward thrust by proprotors 112 and proprotors 114. FIG. 4 shows a side view of boom 122b mounted to wings 104, and proprotors 112b, 114b mounted at opposite ends of boom 122b and tilted in exemplary propulsion configurations, according to some embodiments. During forward flight, yawing moments are created by changing proprotor thrust (via either RPM or pitch).

Figure 5:
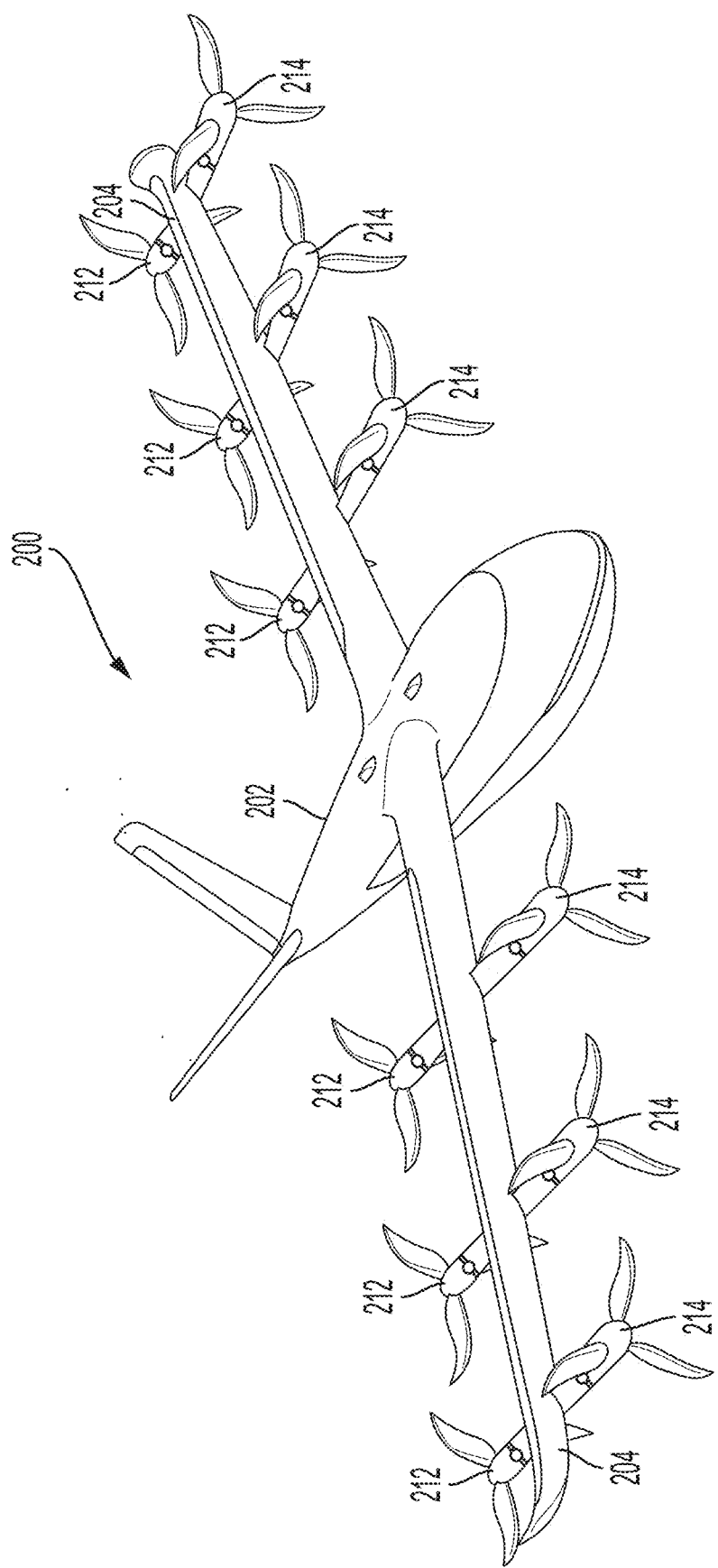
FIG. 5 shows a perspective view of a VTOL aircraft that includes twelve proprotors in lift configurations, according to some embodiments.

Aircraft that have four rotors allow control of the four axes of control—total thrust, rolling moment, pitching moment, and yawing moment. However, should a rotor fail, the aircraft will no longer be able to control the four axes of control. On the contrary, aircraft that have six rotors allow control of the four axes of control even if a rotor should fail. A disadvantage to 6-rotor aircraft is that the motors of the six rotors are required to be more oversized to provide enough thrust to handle the failure conditions compared to aircraft with a greater number of rotors. For example, to handle failure conditions, a 6-rotor aircraft may require a thrust that is 1.8 to 2 times hover thrust capability per motor to handle failure conditions, an 8-rotor aircraft may require a thrust that is 1.6 to 1.7 times hover thrust capability per motor, and a twelve-rotor aircraft may require a thrust that is 1.4 to 1.5 times hover thrust capability per motor. Therefore, aircraft (such as aircraft 100, 200) that have at least eight proprotors can continue to control the four axes of control should a rotor fail and since there are more than four proprotors to provide thrust, the proprotors of the aircraft may be sized smaller than rotors of a 6-rotor aircraft. FIG. 5 shows a perspective view of an exemplary aircraft that includes twelve proprotors in forward propulsion configurations, according to some embodiments. In the example of FIG. 5, aircraft 200 includes six proprotors 214 mounted to wing 204 and positioned forward of a leading edge of the wing 204 and six proprotors 212 mounted to wing 204 and positioned rearward of a trailing edge of the wing 204. The configuration of proprotors 212 and proprotors 212 may be similar to the configuration of proprotors 112 and proprotors 114 as described above.

As described above in reference to FIG. 3, the proprotors 212, 214 of aircraft 200 are positioned so that their blades do not intersect one another and tilted to enhance yaw control authority. In some embodiments, the proprotors 212, 214 are canted so that the planes of rotation of their blades do not intersect passengers and the pilot and/or critical system components to minimize the potential damage resulting from a blade breaking during flight.

Figure 6:
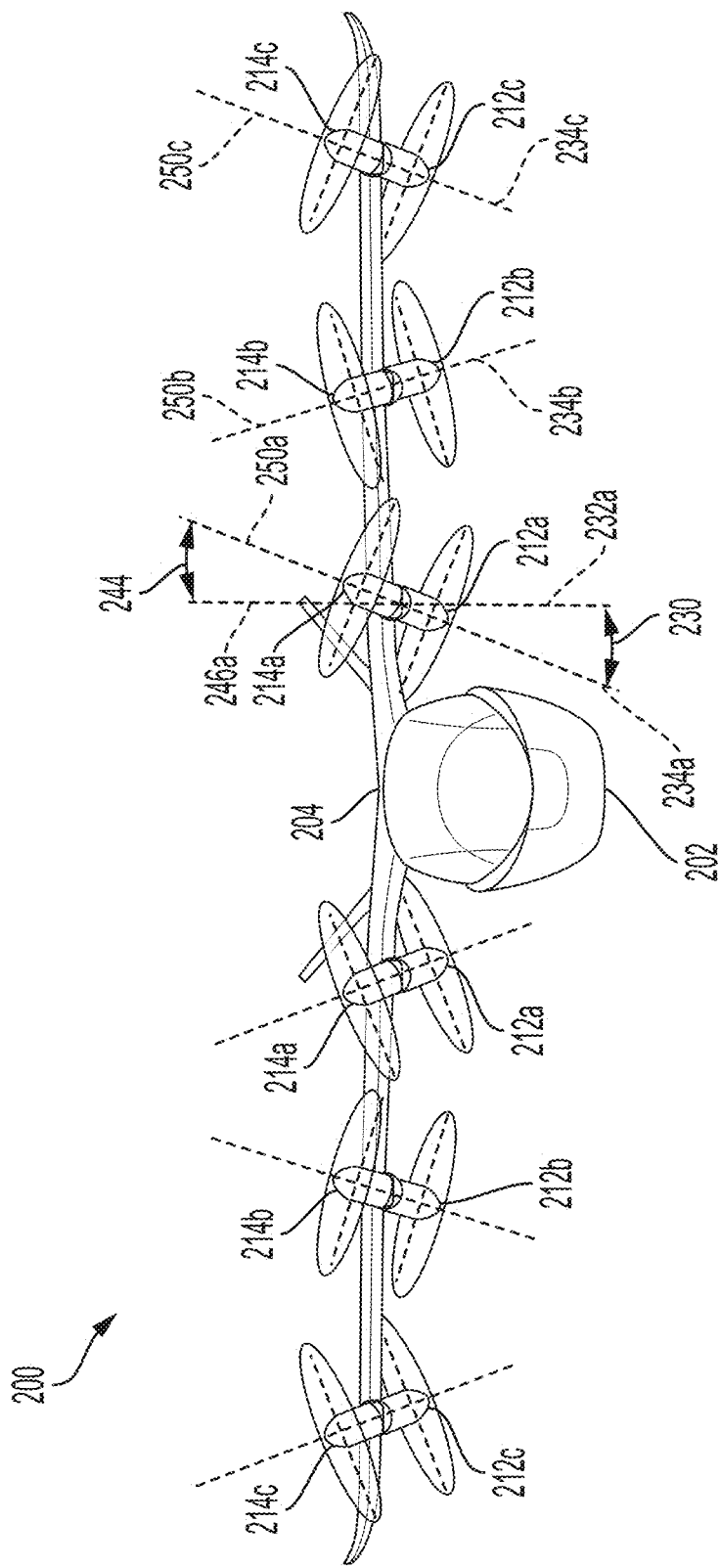
FIG. 6 shows an example of cant angles of proprotors, according to some embodiments.

FIG. 6 shows an example of cant angles of proprotors 212, according to some embodiments. The illustrated cant angle 230 of innermost proprotor 212a measured from vertical 232a can range from 0 to 30 degrees in either direction. In the illustrated embodiment, the outermost proprotor 212c is canted the same amount and in the same direction as the innermost proprotor 212a and the middle proprotor 212b is canted by the same amount but in the opposite direction as the innermost and outermost proprotors 212a, 212c such that the rotational axis 234a of proprotor 212a is parallel to the rotational axis of the rotational axis 234c of proprotor 212c but non-parallel to the rotational axis 234b of proprotor 212b. However, this is merely one example of the relative canting of the proprotors and it will be understood to a person of skill in the art that any suitable combination of proprotor canting (inclusive of no canting) may be used according to the desired performance characteristics of the aircraft.

The proprotors 214 may also be canted in any suitable manner and combination. In some embodiments, the proprotors 214 are canted according to a corresponding proprotor 212. For example, innermost proprotor 214a may be canted at angle 244 from the vertical 246a. Cant angle 244a and cant angle 230 may be the same amount from vertical, but in opposite directions. In the illustrated embodiment, the outermost proprotor 214c is canted the same amount and in the same direction as the innermost proprotor 214a and the middle proprotor 214b is canted by the same amount but in the opposite direction as the innermost and outermost proprotors 214a, 214c such that the rotational axis 250a of proprotor 212a is parallel to the rotational axis of the rotational axis 250c of proprotor 212c but non-parallel to the rotational axis 250b of proprotor 212b. Any suitable combination of canting and/or non-canting of the rotors relative to one another and relative to the proprotors can be used to achieve desired performance characteristics.

Figure 7:
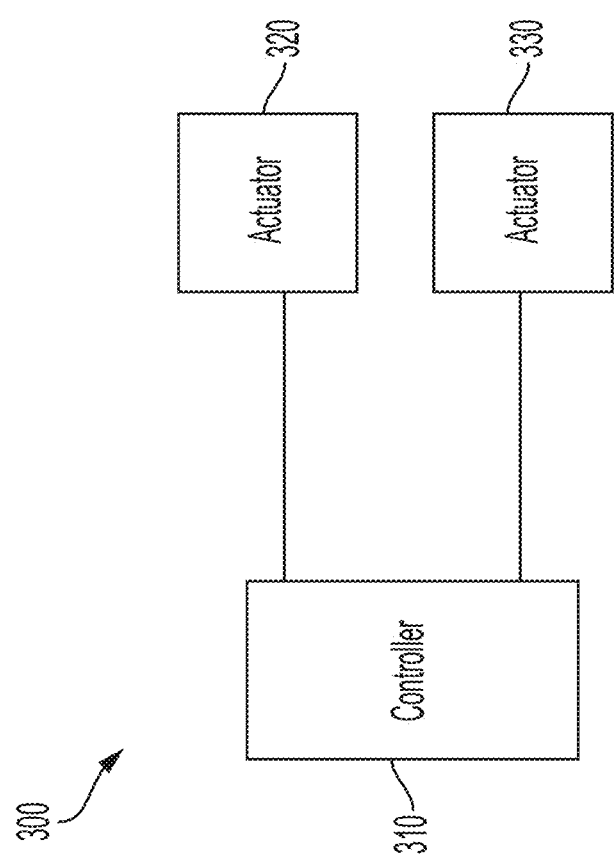
FIG. 7 shows an exemplary control system that controls titling of proprotors, according to some embodiments.

FIG. 7 shows an exemplary control system 300 that controls titling of proprotors, according to some embodiments, such as proprotors 112 and 114 of aircraft 100 of FIG. 1. The control system 300 may include a controller 310 and one or more actuators 320 and 330. Each actuator 320, 330 controls tilting of a respective proprotor. Only two actuators are shown for simplicity and it should be understood that an actuator would be provided for each independently tiltable proprotor. According to some embodiments, the controller 310 may be a processor-based controller. For example, the controller 310 may include one or more processors, memory, one or more programs, wherein the one or more programs are stored in the memory and configured to be executed by the one or more processors. As described above, the actuator can tilt the respective proprotor between vertical thrust positions and forward thrust positions based on control signals from the controller. As described above, the controller may control the actuators to tilt the proprotors to generate yawing moments. According to some embodiments, the controller 310 can control at least some of the one or more actuators 320, 330 to tilt their respective proprotors together despite having separate actuators for each proprotor.

According to some embodiments, the controller 310 can actively adjust the tilt of at least some of the proprotors during take-off and landing and/or hover to provide the required stability and/or maneuvering. According to some embodiments, the controller 310 can actively control the tilt of at least one proprotor during vertical flight and transition flight to generate yawing moments. According to some embodiments, controller 310 can actively control independent tilt of the outermost proprotors during vertical take-off and landing and/or hover to provide yawing moments as needed. In some embodiments, the tilt of the proprotors is fixed (i.e., non-varying) during cruise.

According to some embodiments, each proprotor can be individually controlled by controller 310 via the one or more actuators according to the various operational degrees of freedom. According to some embodiments, the degrees of freedom of at least a portion of the proprotors includes the rotational speed of the proprotors, the collective attack angle of the blades, and the degree of tilt of the proprotors. According to some embodiments, any of these degrees of freedom can be actively controlled by the controller 310 (either autonomously or in response to pilot commands) during take-off and landing in order to provide the appropriate stability and maneuvering.

Figure 8:
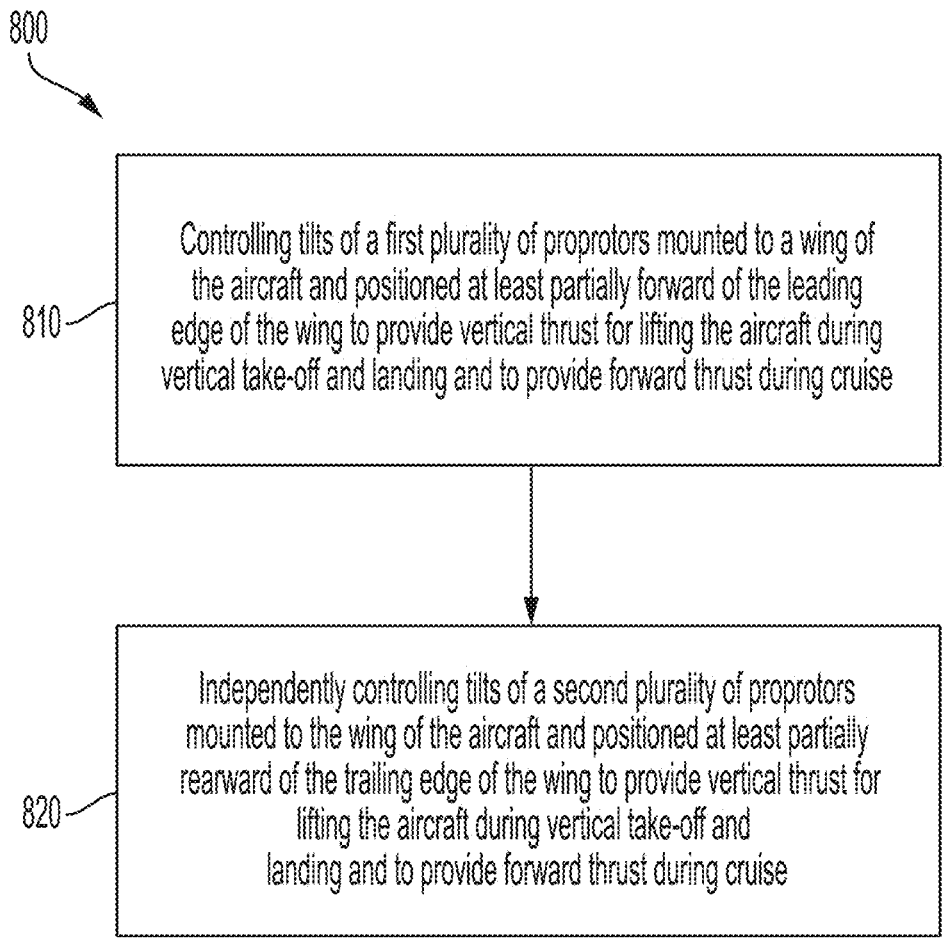
FIG. 8 shows a flowchart of an exemplary method for operating a VTOL aircraft, according to some embodiments.

FIG. 8 illustrates a flowchart of an exemplary method 800 for operating an aircraft, according to some embodiments. According to some embodiments, the method 800 can be implemented in aircraft 100 and aircraft 200 described above. According to some embodiments, the method 800 can be performed by the control system 300. At step 810, tilts of a first plurality of proprotors mounted to a wing of the aircraft and positioned at least partially forward of the leading edge of the wing may be independently controlled to provide vertical thrust for lifting the aircraft during vertical take-off and landing and to provide forward thrust during cruise.

At step 820, tilts of a second plurality of proprotors mounted to the wing of the aircraft and positioned at least partially rearward of the trailing edge of the wing may be independently controlled to provide vertical thrust for lifting the aircraft during vertical take-off and landing and to provide forward thrust during cruise. The tilts of the second plurality of proprotors may be controlled independently of the tilts of the first plurality of proprotors.

According to some embodiments, each proprotor may be controlled by separate actuators. That is, each proprotor may be tilted independent of all other proprotors via its respective actuator. For example, an actuator of a first proprotor of the first plurality of proprotors may tilt the first proprotor independent of other proprotors of the first plurality of proprotors and independent of the second plurality of proprotors. Likewise, an actuator of a second proprotor of the second plurality of proprotors may tilt the second proprotor independent of other proprotors of the second plurality of proprotors and independent of the first plurality of proprotors.

According to some embodiments, the tilts of the second plurality of proprotors may be controlled for differential tilting. That is, controlling the tilts of the second plurality of proprotors may include tilting at least one proprotor of the second plurality of proprotors and tilting at least another proprotor of the second plurality of proprotors. The differential tilting may help generate a yawing moment. The at least one proprotor of the second plurality of proprotors and the at least one other proprotor of the second plurality of proprotors may be positioned on opposite sides of the wing. For example, the wing may be mounted to a fuselage, and the at least one proprotor of the second plurality of proprotors may be mounted to the wing to the left of the fuselage and the at least other proprotor of the second plurality of proprotors may be mounted to the wing to the right of the fuselage. Such tilting in opposite directions of proprotors of the second plurality of proprotors can include tilting to small angles (0 to 30 degrees). Likewise, the tilts of the first plurality of proprotors may be controlled for differential tilting. According to some embodiments, at least one proprotor of the first plurality of proprotors and at least one proprotor of the second plurality of proprotors may be differentially tilted.

According to some embodiments, each proprotor of the first plurality of proprotors and each proprotor of the second plurality of proprotors may include a pivot axis. According to some embodiments, independently controlling tilts of the first plurality of proprotors may include tilting at least one proprotor of the first plurality of proprotors about its pivot axis in a first direction, and independently controlling tilts of the second plurality of proprotors may include tilting at least one proprotor of the second plurality of proprotors about its pivot axis in a direction opposite to the first direction. For example, during lift, a proprotor mounted forward of a leading edge of the wing may tilt upward about its pivot axis and a proprotor mounted rearward of a trailing edge of the wing may tilt downward about its pivot axis. During forward flight, a proprotor mounted forward of a leading edge of the wing may tilt downward about its pivot axis to its forward thrust position and a proprotor mounted rearward of a trailing edge of the wing may tilt upward about its pivot axis to its forward thrust position.

According to various embodiments, the tilts of the proprotors may be independently controlled according to method 800 via a control allocation algorithm that accounts for rotor acoustics and/or battery pack energy balance in distributing control effort among the actuators of the aircraft, which can include the tilts of the proprotors. Suitable control allocation methods are disclosed in commonly owned U.S. patent application Ser. No. 17/157,580, filed Jan. 25, 2021, and titled "Systems and Method for Control Allocation for Electric Vertical Takeoff and Landing Aircraft," the entire contents of which is incorporated herein by reference.

Figure 9:
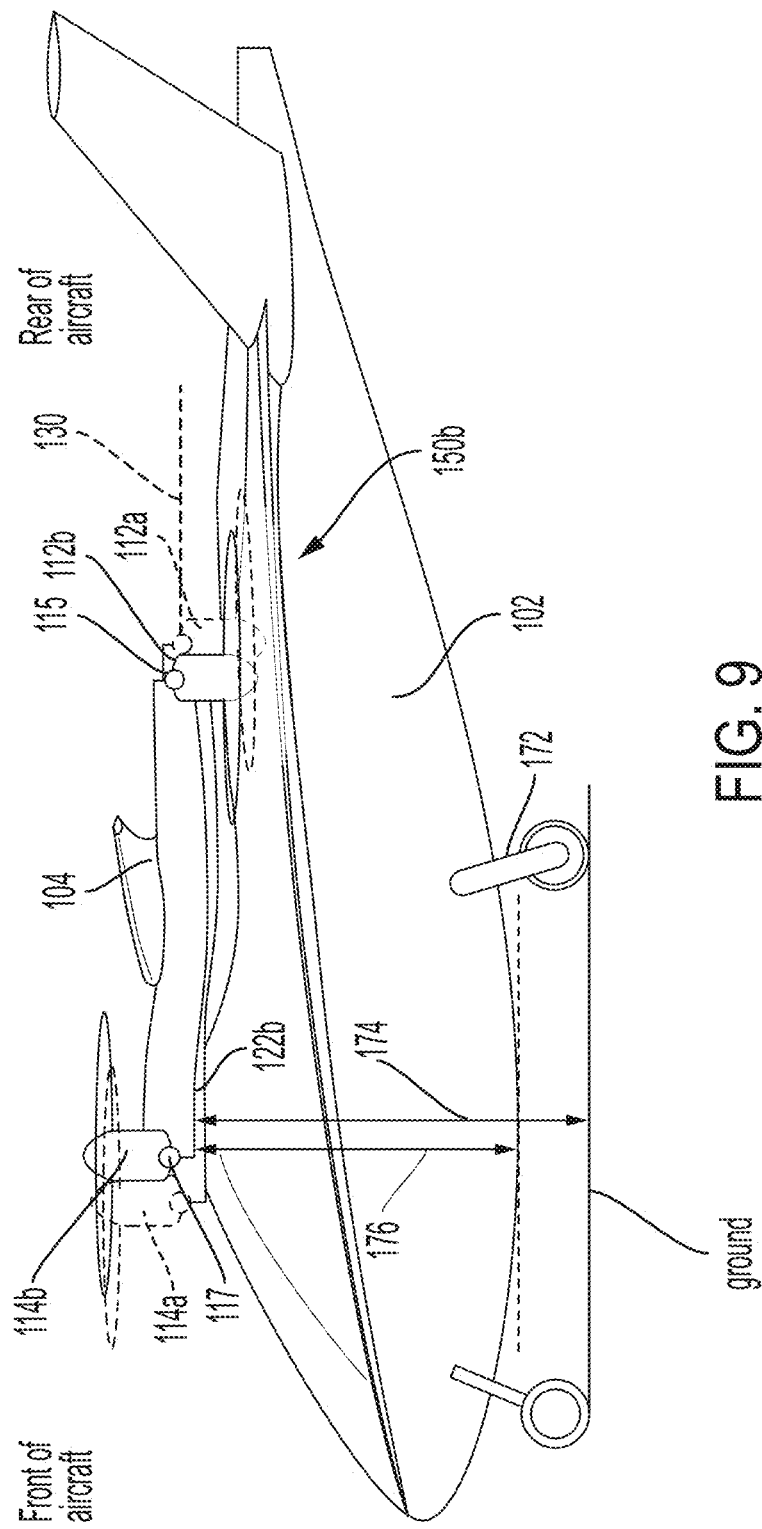
FIG. 9 illustrates height of the booms relative to the ground when the aircraft is supported on the ground by its landing gear, according to some embodiments.

FIG. 9 illustrates the height of the booms relative to the ground when the aircraft 100 is supported by its landing gear 172, according to some embodiments. The aircraft 100 may be configured so that a bottommost of the booms 122a, 112b (boom 122a is not shown in FIG. 9) are located a first distance 174 above the ground when the aircraft 100 is supported by its landing gear 172. According to some embodiments, the first distance 174 may be about the height of a typical doorway. According to some embodiments, the first distance 174 may be about at least 4 feet, 5 feet, or 6 feet. According to some embodiments, the first distance 174 may be at most 9 feet, 8 feet, or 7 feet. According to some embodiments, the first distance 174 may be about 4-9 feet, 5-8 feet, or 6-7 feet. Additionally, a bottommost of the booms 122a, 112b may be a second distance 176 from a bottommost of the fuselage 102. According to some embodiments, the second distance 176 may be about at least 3 feet, 4 feet, or 5 feet. According to some embodiments, the second distance 176 may be at most 8 feet, 7 feet, or 6 feet. According to some embodiments, the second distance 176 may be about 3-8 feet, 4-7 feet, or 5-6 feet. According to some embodiments, location of the wings in high positions on the upper portion of the fuselage 102 can ensure maximum head room for people entering and exiting the aircraft.

According to some embodiments, aircraft 100, 200 may include only one wing on each side of the aircraft 100, 200 or a single wing that extends across the aircraft. According to some embodiments, the wings are located high on the fuselage for easy passenger ingress and egress. For example, the at least one wing 104, 204 is a high wing mounted to an upper side of the fuselage 102, 202. According to some embodiments, the aircraft can be configured so that the bottom of the booms supporting the rotor and proprotors are above the head of an average sized person, which also contributed to ease of ingress and egress.

According to some embodiments, the wings include control surfaces, such as flaps and/or ailerons. The control surfaces of the wings and/or rear stabilizers can be used for aircraft maneuvering and stability in a conventional manner. According to some embodiments, the wings can have curved wing tips 109 for reduced drag during forward flight.

According to some embodiments, the proprotors 112 and proprotors 114 are all electrically powered. Batteries for powering the proprotors 112 and proprotors 114 can be located in any suitable locations of the aircraft, including in the fuselage and/or the wings. The number and power of the proprotors can be selected according to the desired performance parameters (e.g., target payload, airspeed, and altitude). According to some embodiments, the maximum power rating of one or more of the proprotors is 500 kilowatts or less, preferably 200 kilowatts or less, more preferably 150 kilowatts or less. According to some embodiments, the maximum power rating of one or more of the proprotors is at least 10 kilowatts, preferably at least 20 kilowatts, more preferably, at least 50 kilowatts. The number of proprotors can range from as little as 8 (4 on each side of the aircraft) to a maximum of 24 (12 on each side of the aircraft). Preferably, the number of proprotors is in the range of 8 to 12. The aircraft can have an equal number of proprotors 112 and proprotors 114, a greater number of proprotors 112, or a greater number of proprotors 114.

Aircraft according to the principles discussed above can be configured to carry up to 10 people, preferably up to 6 people, and more preferably up to 4 people. According to some embodiments, the aircraft is configured to be piloted and includes piloting controls. In some embodiments, the aircraft is configured to operate autonomously without any onboard pilot.

According to some embodiments, the aircraft is configured to carry up to 6 people (for example, a pilot and up to 5 passengers) up to 75 miles at a cruising speed of up to 150 miles per hour at an altitude of up to 3,000 feet above ground. In some embodiments, the aircraft is configured for 5 people, such as one pilot and four passengers. According to various embodiments, the maximum range on a single battery charge is 25 miles, 50 miles, 75 miles, 100 miles, or 200 miles.

According to some embodiments, the wingspan is in the range of 10 to 20 meters, preferably in the range of 15 to 16 meters. According to various embodiments, the length of the aircraft is in the range of 3 to 20 meters, preferably in the range of 5 to 15 meters, more preferably in the range of 6 to 10 meters.

According to some embodiments, the aircraft is operated during take-off and landing by positioning the proprotors in lift positions and providing the required lift to the aircraft via the combined lift provided by the proprotors 112 and proprotors 114. According to some embodiments, during vertical take-off and landing and/or hover, the proprotors can be maintained in predetermined lift positions that can be the same across all proprotors or different for different proprotors.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An electric vertical take-off and landing aircraft comprising:
   a fuselage;
   at least one tail extending from the fuselage;
   a single wing that extends across the fuselage or a single pair of wings extending from each side of the fuselage, wherein the single wing or single pair of wings are the only wings of the aircraft;
   a first plurality of proprotors mounted to the single wing or single pair of wings, positioned at least partially forward of a leading edge of the single wing or single pair of wings, and tiltable between lift configurations for providing lift for vertical take-off and landing of the aircraft and propulsion configurations for providing forward thrust to the aircraft;
   a second plurality of proprotors mounted to the single wing or single pair of wings, positioned at least partially rearward of a trailing edge of the single wing or single pair of wings, and tiltable between lift configurations for providing lift for vertical take-off and landing of the aircraft and propulsion configurations for providing forward thrust to the aircraft, wherein each proprotor of the second plurality of proprotors has fewer blades that each proprotor of the first plurality of proprotors; and
   a plurality of booms on each side of the fuselage that are mounted to the single wing or single pair of wings inward of ends of the single wing or single pair of wings, wherein each boom supports one proprotor of the first plurality of proprotors and one proprotor of the second plurality of proprotors, and wherein, for a respective boom, a rearward end of a respective proprotor of the first plurality of proprotors is pivotably mounted to a forward-most end of the respective boom and a forward end of a respective proprotor of the second plurality of proprotors is pivotably mounted to a rearward-most end of the respective boom, wherein a midpoint of each boom is mounted to the wing such that proprotors mounted to a respective boom are equidistant from the wing, and wherein the booms decrease in length from inward-most booms to outward-most booms such that:
      an inward-most proprotor of the second plurality of proprotors is rearward of an outermost proprotor of the second plurality of proprotors, and
      an inward-most proprotor of the first plurality of proprotors is forward of an outermost proprotor of the first plurality of proprotors,
   wherein the first plurality of proprotors and the second plurality of proprotors are independently tiltable, and
   wherein all propulsion available for the aircraft is provided by the first and second plurality of proprotors mounted to the single wing or single pair of wings.

2. The aircraft of claim 1, comprising a control system configured to independently tilt at least one proprotor of the second plurality of proprotors relative to another proprotor of the second plurality of proprotors.

3. The aircraft of claim 1, comprising a control system configured to independently tilt at least one proprotor of the second plurality of proprotors relative to at least one proprotor of the first plurality of proprotors.

4. The aircraft of claim 1, wherein the first plurality of proprotors comprises at least four proprotors and the second plurality of proprotors comprises at least four proprotors.

5. The aircraft of claim 1, wherein each proprotor of the first plurality of proprotors and each proprotor of the second plurality of proprotors has at least three blades.

6. The aircraft of claim 1, wherein a sum of disc area of the first plurality of proprotors and the second plurality of proprotors is at least an area of the single wing or single pair of wings.

7. The aircraft of claim 1, wherein a proprotor of the second plurality of proprotors is in a canted fixed position relative to another proprotor of the second plurality of proprotors such that a rotational axis of the proprotor is non-parallel with a rotational axis of the other proprotor.

8. The aircraft of claim 1, wherein a range of tilt of at least one proprotor of the second plurality of proprotors is greater than ninety degrees.

9. The aircraft of claim 1, wherein the single wing or single pair of wings is a high wing mounted to an upper side of the fuselage.

10. The aircraft of claim 1, wherein an electric power of at least one of the first plurality of proprotors and the second plurality of proprotors is at least 10 kilowatts.

11. The aircraft of claim 1, wherein the aircraft is manned.

12. The aircraft of claim 1, wherein, when the first plurality of proprotors and the second plurality of proprotors are in the lift configurations, blades of the first plurality of proprotors are above the single wing or single pair of wings and blades of the second plurality of proprotors are below the single wing or single pair of wings.

13. The aircraft of claim 1, wherein the plurality of booms merge with the leading edge of the single wing or single pair of wings.

14. The aircraft of claim 1, wherein a proprotor of the second plurality of proprotors that is between the inward-most proprotor of the second plurality of proprotors and the outermost proprotor of the second plurality of proprotors is forward of the inward-most proprotor of the second plurality of proprotors and rearward of an outermost proprotor of the second plurality of proprotors.

15. The aircraft of claim 1, wherein each boom of the plurality of booms merges with the leading edge of the single wing or single pair of wings such that at least a portion of an upper surface of the single wing or single pair of wings extending above the boom is uninterrupted by the boom.

16. The aircraft of claim 1, wherein the blades of the first plurality of proprotors rotate in a first direction and the blades of the second plurality of proprotors rotate in a second direction that is opposite the first direction in order to balance gyroscopic loading on the wings.

17. The aircraft of claim 1, wherein a tip speed of the blades of each proprotor is at most 0.7 Mach.

18. The aircraft of claim 17, wherein a diameter of blades of each proprotor is 1 to 5 meters.

19. The aircraft of claim 1, wherein adjacent booms are mounted at different heights such that blades of adjacent proprotors are at different heights.

20. A method for operating an electric vertical take-off and landing aircraft, comprising:
   independently controlling tilts of a first plurality of proprotors mounted to a wing of the aircraft and positioned at least partially forward of the leading edge of the wing to provide vertical thrust for lifting the aircraft during vertical take-off and landing and to provide forward thrust during cruise; and independently controlling tilts of a second plurality of proprotors mounted to the wing of the aircraft and positioned at least partially rearward of the trailing edge of the wing to provide vertical thrust for lifting the aircraft during vertical take-off and landing and to provide forward thrust during cruise, wherein each proprotor of the second plurality of proprotors has fewer blades that each proprotor of the first plurality of proprotors, wherein the wing is a single wing that extends across a fuselage of the aircraft or a single pair of wings extending from each side of the fuselage, wherein the single wing or single pair of wings are the only wings of the aircraft, and the aircraft comprises at least one tail extending from the fuselage and a plurality of booms on each side of the fuselage that are mounted to the single wing or single pair of wings inward of ends of the single wing or single pair of wings, wherein each boom supports one proprotor of the first plurality of proprotors and one proprotor of the second plurality of proprotors, and wherein, for a respective boom, a rearward end of a respective proprotor of the first plurality of proprotors is pivotably mounted to a forward-most end of the respective boom and a forward end of a respective proprotor of the second plurality of proprotors is pivotably mounted to a rearward-most end of the respective boom, wherein a midpoint of each boom is mounted to the wing such that proprotors mounted to a respective boom are equidistant from the wing, and wherein the booms decrease in length from inward-most booms to outward-most booms such that: an inward-most proprotor of the second plurality of proprotors is rearward of an outermost proprotor of the second plurality of proprotors, and an inward-most proprotor of the first plurality of proprotors is forward of an outermost proprotor of the first plurality of proprotors, and wherein all propulsion available for the aircraft is provided by the first and second plurality of proprotors mounted to the single wing or single pair of wings.

21. The method of claim 20, wherein independently controlling tilts of the second plurality of proprotors comprises tilting at least one proprotor of the second plurality of proprotors and tilting at least another proprotor of the second plurality of proprotors.

22. The method of claim 20, wherein independently controlling tilts of the first plurality of proprotors comprises tilting at least one proprotor of the first plurality of proprotors about a pivot axis of the at least one proprotor of the first plurality of proprotors in a first direction, and independently controlling tilts of the second plurality of proprotors comprises tilting at least one proprotor of the second plurality of proprotors about a pivot axis of the second plurality of proprotors in a direction opposite to the first direction.

23. The method of claim 20, wherein independently controlling tilts of the first plurality of proprotors comprises tilting at least one proprotor of the first plurality of proprotors independent of at least another proprotor of the first plurality of proprotors, and independently controlling tilts of the second plurality of proprotors comprises tilting at least one proprotor of the second plurality of proprotors independent of at least another proprotor of the second plurality of proprotors.

* * * * *